Sept. 5, 1933.   G. M. BACON   1,925,893
MILK DELIVERY MOTOR VEHICLE
Filed Nov. 21, 1927   4 Sheets-Sheet 1

INVENTOR.
George M. Bacon
BY
ATTORNEYS

Patented Sept. 5, 1933

1,925,893

UNITED STATES PATENT OFFICE 1,925,893

MILK DELIVERY MOTOR VEHICLE

George M. Bacon, Detroit, Mich., assignor, by mesne assignments, to Continental-Divco Company, Detroit, Mich., a corporation of Michigan Application November 21, 1927
Serial No. 234,765

43 Claims. (Cl. 180—77)

The invention relates to motor vehicles designed to be used as delivery cars and more particularly for house to house route deliveries such as milk routes.

In the present state of the art horse drawn vehicles are usually employed for such purpose and while motor vehicles have been tried they have not proven satisfactory. This is due to the peculiar conditions under which such route delivery cars must operate and for which motor cars as heretofore constructed have not been adapted.

It is the object of the present invention to obtain a construction of motor vehicle which, while conforming to standard practice in many of the details of its construction, is so modified as to avoid the difficulties which have been heretofore encountered. With this object in view the invention consists in the various features of construction as hereafter set forth;

Generally described my improvement comprises a chassis including an internal combustion engine with a change speed transmission, a propeller shaft and driving axle together with the usual controls therefor. The engine is preferably of the vertical multi-cylinder type and the transmission is preferably of the shiftable gear type. These parts are of any suitable design. I have, however, in one phase of my invention departed from the usual arrangement of these elements on the chassis by placing the engine in rear of its usual position and separating the same from the radiator mounted at the front end of the chassis frame. This permits of locating the steering mechanism, motor control and brake pedals between the radiator and the engine and in extending the vehicle body to substantially the full length of said chassis frame. It also permits of shortening the wheel base without diminishing the volume within the body for receiving the load. Other features of my invention, such as the arrangement of controls in relation to a low driving platform or floor are not limited to the foregoing arrangement of engine and other parts, since such features are equally well adapted to any type of low standing floor vehicle.

In addition to the controls which are located in front of the engine and which are operable from the driver's seat arranged above the engine, I have provided auxiliary controls which are operable from without the body. These controls provide for broadly novel improvements in themselves and in the illustrated embodiment consist in gear shifting and braking means located above one or more platforms depending from the chassis, and a steering lever which, while located centrally within the body in rear of the driver's seat, may be reached through side door openings from the platforms. These controls also include other parts and functions more particularly hereinafter referred to. The lever is rockable in a transverse plane and is so connected with the steering mechanism that the vehicle will be turned in the direction in which the lever is rocked. This lever is also preferably detachable so that when desired it may be removed and the space occupied thereby may be utilized for additional load, the vehicle then being steered from the controls located in front of the driver's seat. Thus when delivery points are close together it is not necessary for the delivery man to mount to the driver's seat as he may shift the car from house to house by operating it from the platform. Thus, the low driving platform and associated controls, constitute the essential standing driving means for the vehicle, and the forward driving station may be dispensed with, if desired. As has been stated, the body is preferably substantially the entire length of the chassis frame. At its forward end and on opposite sides of the radiator are door openings normally closed by folding doors which permit of entrance and exit of the driver. In addition to these openings there are side doors arranged above the platform and opposite each other and also rear doors. The main load is carried in the compartment between the side door openings and the rear doors, the dimensions being such as to receive a predetermined number of boxes of uniform size arranged in longitudinal, transverse and vertical series. The space in front of the side doors provides for at least one tier of boxes in rear of the driver's seat which latter is mounted on a transversely extending hood enclosing the vertically projecting portion of the internal combustion engine. The hood extends from side to side of the body and in addition to the space occupied by the driver's seat provides a loading area. Thus the general arrangement is such as to leave a free aisle through the center of the body for convenient access to the load both in front and in rear thereof and for reaching the steering lever from the driving platform. A large portion of the load can be reached by the operator without the necessity of entering the body and he may also find access to the load through the rear doors.

I have also provided improvements facilitating the operation of the house-to-house types of delivery vehicles wherein the operator may operate a gear shift lever and control the engine throttle with one hand, leaving his other hand and feet free. These features of my invention are very important in themselves for facilitating standing operation of the vehicle.

In vehicles of the house-to-house delivery type, wherein the vehicle operator controls the vehicle while standing on a driving platform, it is very desirable to modify the arrangement and form of controls which are conventionally used in other types of engine propelled motor vehicles, such as ordinary trucks or pleasure cars, wherein the driver is seated. In the latter instance the driver has his two hands and two feet available for operating the various vehicle controlling mechanisms, but where the driver must stand, it is obvious that he must utilize one foot for standing, thereby giving rise to problems of arrangement of the various controlling mechanisms.

In the broader aspects and objects of my invention I have provided a plurality of vehicle controlling mechanisms in association with a driving platform of any suitable type and construction preferably of the depressed or low type for convenient single step approach of the operator, at least one of the controlling mechanisms having a multiple function of vehicle control, thereby facilitating the standing driving operations. Such provisions are obviously not dependent in any manner on the other features of my invention but are distinct therefrom and capable of wide variation and modification within the limits of the broad teachings of my invention as defined by the broad terms of my appended claims.

In the illustrated embodiment of my invention this multiple function controlling mechanism consists in either (or both as illustrated) a combined gear shift lever and engine throttle control or means preferably in the nature of a pedal (or other means preferably manually actuable by one continuous movement of one of the operator's feet) for effecting or controlling clutch control between the engine and vehicle and also effecting or controlling an additional function of vehicle control such as braking.

I have thus arranged for the operator to have control of a plurality of vehicle controlling functions at a common controlling mechanism, thereby reducing the usual requirements of diverting the driver's attention from his driving to shifting his hands or feet in accomplishing the several functions which comprise the aforesaid multiple function control.

In a further somewhat more limited aspect of my invention, I have provided three vehicle controlling mechanisms for manual operation respectively by the three available manual members of the operator. Thus, while standing on one foot on the low level platform, the operator has one foot for pedal operation, one hand for steering, and another hand for operating a control. My invention provides for combined clutch and brake control by said one foot, while the operator is standing mostly on his other foot, and the hand of the operator, not engaged in steering, can control the gear shift and engine throttle in simultaneous or correlated fashion without requiring the operator to shift his hand relative to the shift lever.

In getting the vehicle under way, as when leaving the curb after a delivery, the operator can quickly and conveniently manipulate all of these controls in correlated fashion. I use the term "manual" as applied to vehicle control, throughout the specification and claims, in the broad sense of either hand or foot actuation, unless otherwise specifically qualified.

In motor vehicles, it is generally desirable to provide braking means in addition to that ordinarily actuated so as to provide a safety or emergency feature. I have illustrated such a braking means operable by an additional pedal associated with the low platform closely adjacent the combined clutch and brake pedal, although it will be understood that such braking means may be hand lever operated if desired. I have preferred to illustrate the additional brake as a pedal, since it is often desirable to merely slow the vehicle down by the application of a brake without stopping. In such instance it is not necessary for the operator to actuate the combined clutch and brake pedal and the clutch may consequently be saved a certain amount of wear. Furthermore, by arranging the brake pedal and the combined clutch and brake pedal closely adjacent each other, they may be conveniently selectively operated by one foot of the operator while standing mostly on his other foot on the low platform.

I preferably also provide a seat in the vehicle, the operator when seated having full control of the vehicle and preferably actuating at least one of the multiple functioning mechanisms actuated when standing.

I have also provided improvements facilitating the operation of the house-to-house types of delivery vehicles wherein the operator may operate a gear shift lever and control the engine throttle with one hand, leaving his other hand and feet free. These features of my invention are very important in themselves for facilitating standing operation of the vehicle.

In detail as specifically shown A are the side sills of a chassis frame which extend generally longitudinally of the vehicle from end to end. B are horizontally extending cross bars connecting the sills A in front, in rear and at intermediate points. C is a radiator mounted about the forward end of the frame. D is a vertical multi-cylinder explosion engine in rear of and spaced from the radiator being mounted upon the frame and extending upward above the level of the side sills. E is a variable speed transmission gearing preferably of the shift gear type arranged in rear of the engine D. F is a propeller shaft between the transmission and the axle G being preferably connected to the latter through the medium of suitable gearing in housing H.

At opposite sides of the sills A and depending therefrom are the platforms I. There are also provided steps J at the front of the frame at opposite sides of the radiator for assistance in mounting to the driver's seat. K is a hood extending transversely across the chassis frame and enclosing the outwardly projecting portion of the motor D. This hood is hinged for folding back for access to the motor but in normal position forms a substantially rectangular box having arranged at one side thereof the driver's seat L leaving the remaining portion for loading and between the radiator and the hood K is the air tunnel M which at its forward end is flared to form a hood M' in rear of the radiator and enclosing the fan. The hoods M' and K and the tunnel M are open at the bottom to permit the escape of air in a downward direction as well as rearwardly and around the engine.

The specific construction of certain of the controls forms the subject matter of another application for patent now issued to me as Patent No. 1,737,489 dated Nov. 26, 1929. In general the controls include a combined clutch and brake operating pedal N, a brake operating pedal O located in the space between the radiator and the driver's seat, the pedal N being connected by the rod N' to actuate a rock shaft $N^2$ which in turn is operably connected by the rod $N^3$ with the clutch located within the usual housing 10 but which is not shown. The pedal O is connected by a rod O' to actuate the rock shaft $O^2$ and the latter, through the link $O^3$, is operably connected with the rock shaft $O^4$, the latter being suitably connected by rods $O^5$ with the usual wheel brakes (not shown). The rock shafts $N^2$ and $O^2$ extend completely across the chassis frame and have connected with the opposite ends the auxiliary operating pedals $N^4$, $N^5$, and $O^6$, $O^7$. These are arranged in a convenient position above the platform to be operated by the delivery man while standing on said platform.

Figure 1:
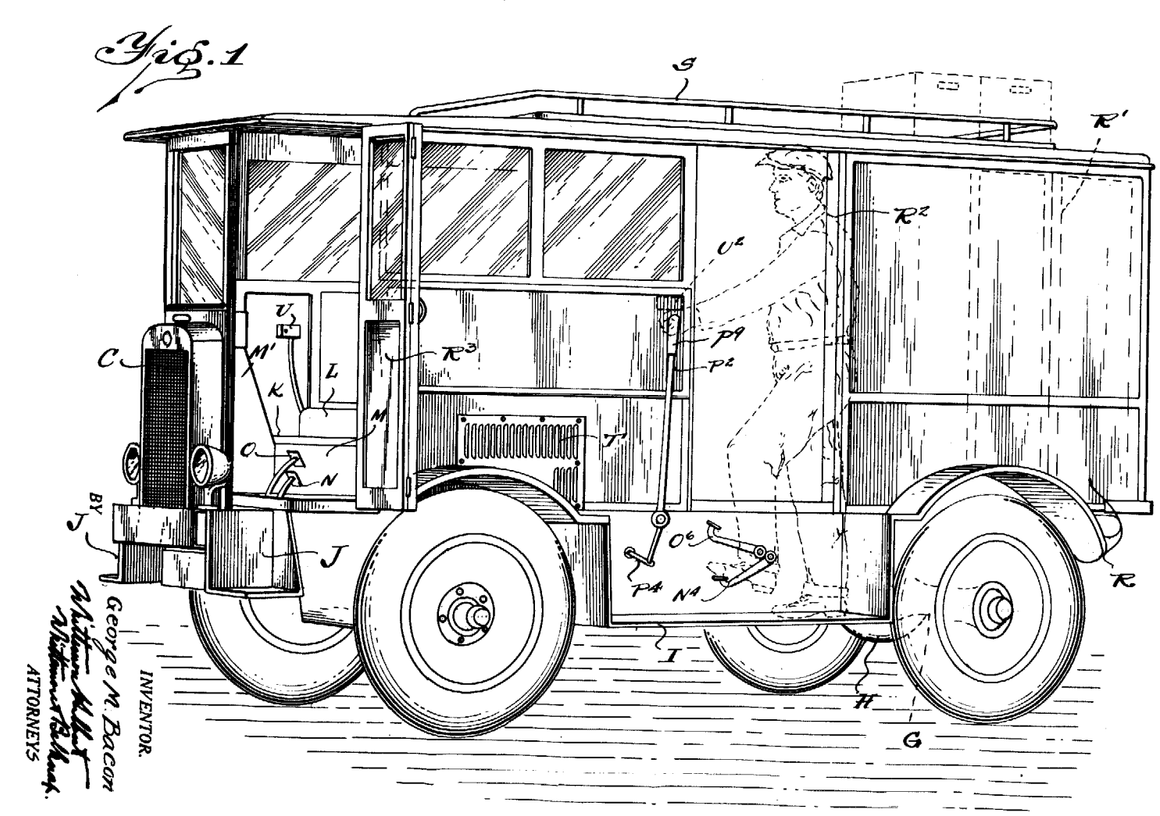
Figure 1 is a perspective view illustrating the manner of driving the vehicle from the running board.
Figure 2:
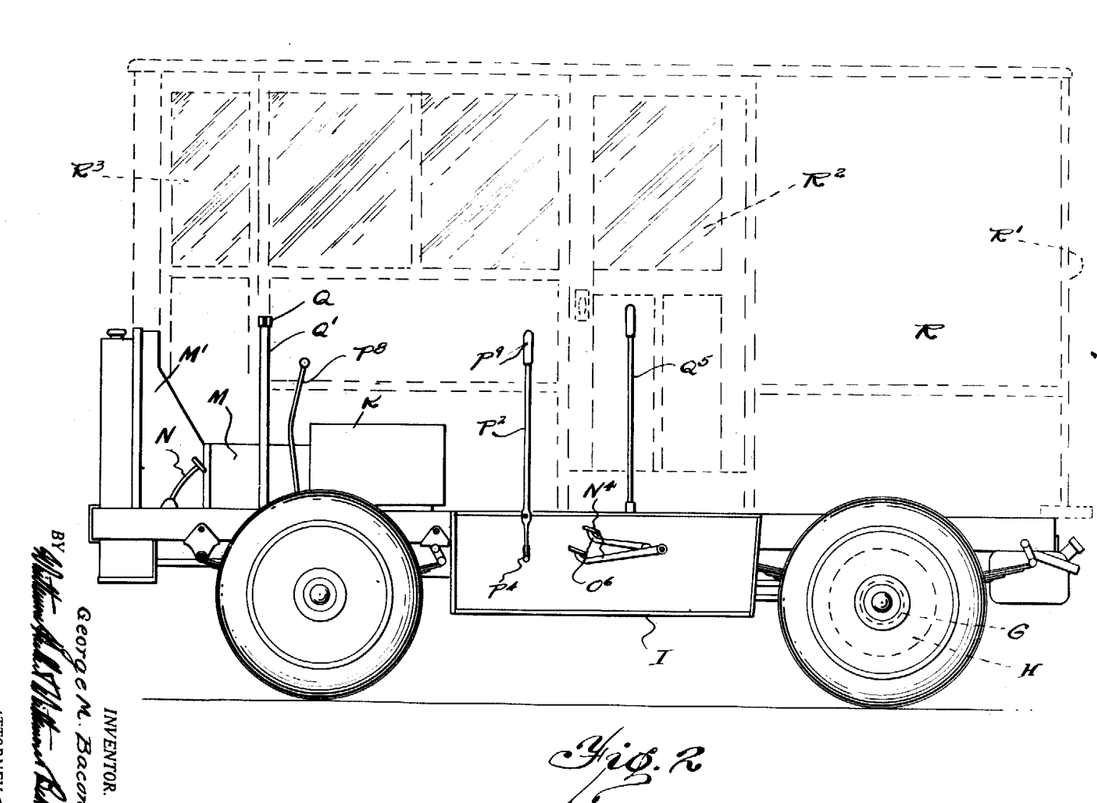
Figure 2 is a side elevation showing the chassis in full lines and the body in dotted lines.
Figure 3:
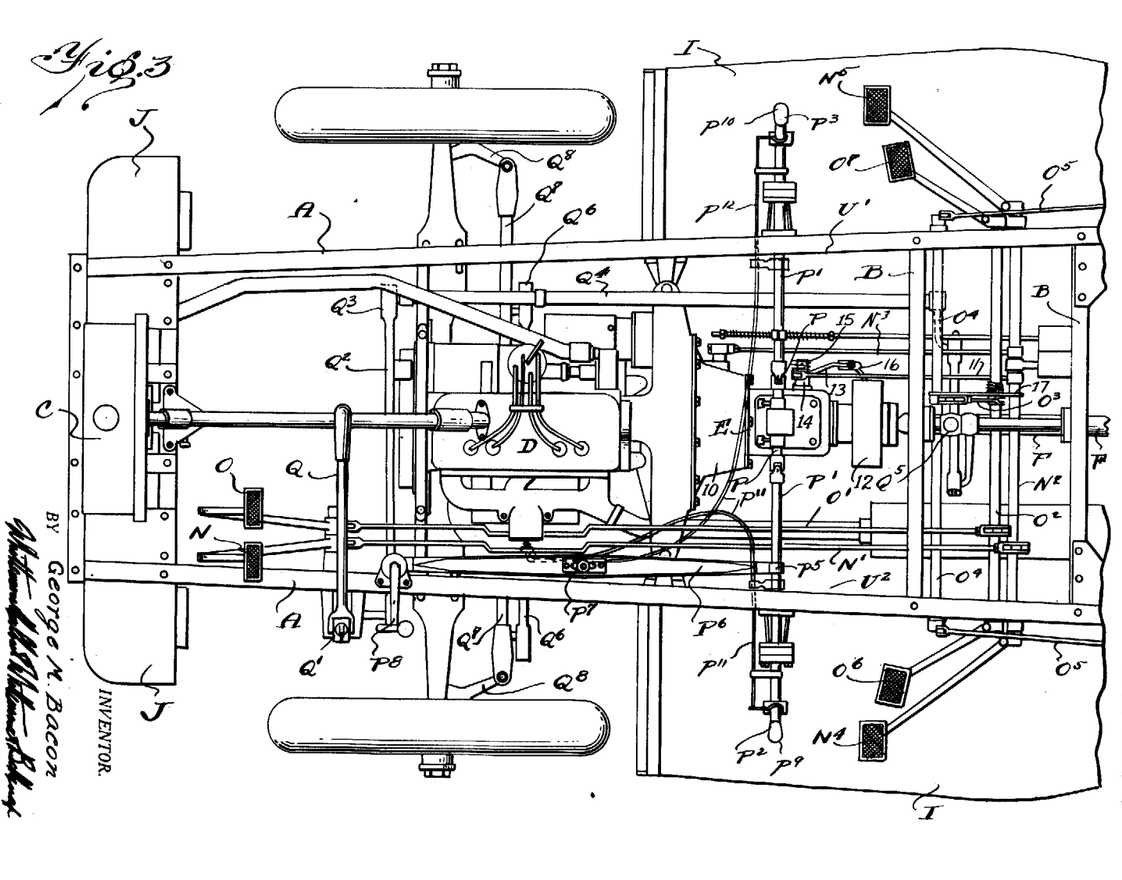
Figure 3 is a plan view of the chassis.
Figures 4, 5:
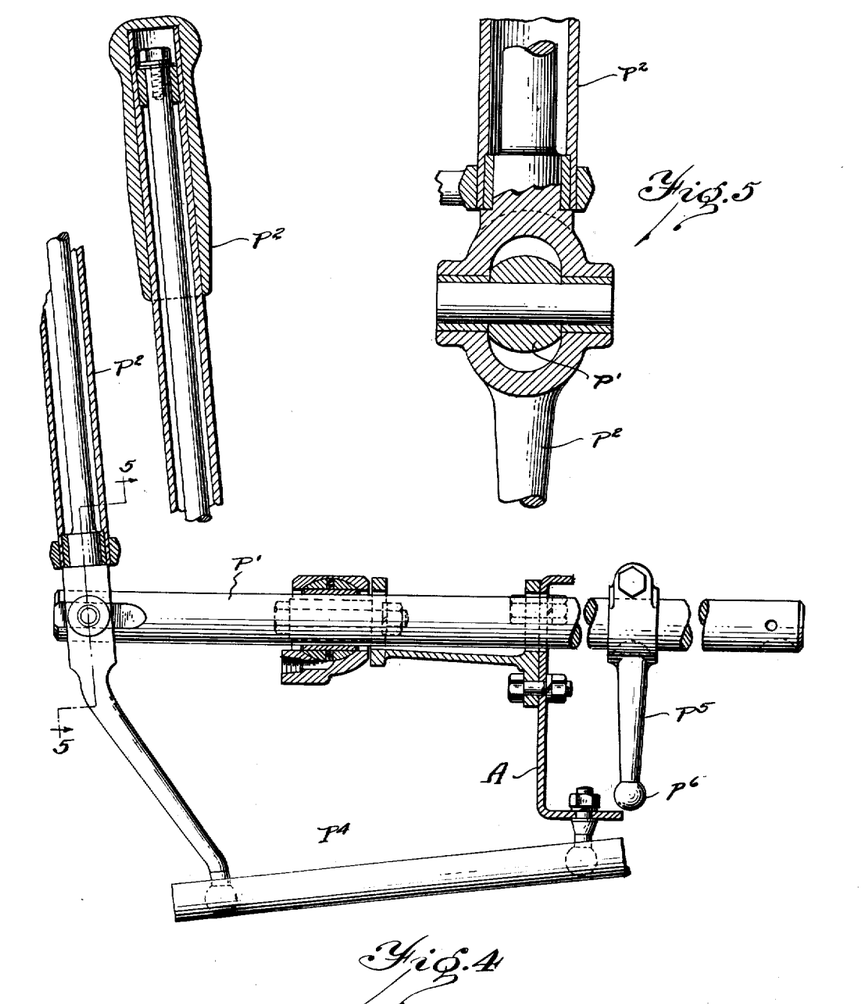
Figure 4 is a cross section showing the gear shift mechanism.
Figure 5 is a section on line 5—5 of Figure 4.

Each of the pedals $N^4$, $N^5$, control the clutch and vehicle braking, and the pedals $O^6$, $O^7$, are emergency brake pedals or brake applying means in addition to the braking effected by pedals $N^4$, $N^5$. When either pedal N, $N^4$ or $N^5$, is depressed by the operator, the first part of the pedal travel rocks shaft $N^2$ and actuates rod $N^3$ to release the clutch, further movement of any of these pedals further rocking shaft $N^2$ and actuating a rod or link 11 which actuates a brake generally designated at 12. The latter type of brake is well known in the art as a propeller shaft brake and is customarily used in motor vehicles, as a parking or emergency brake. I have not illustrated the details of the brake 12, the clutch within housing 10, the transmission mechanism E, detail parts of engine D, gearing in housing H, the usual brake for the rear vehicle wheels, or many other parts, since such parts are in wide usage in the motor vehicle art and are all well known. In order to actuate the brake 12 from rod 11, the latter at its forward end actuates a lever 13 pivoted on a transmission post or arm 14, a spring 15 assisting to hold the lever 13 in position. The lever 13 in turn actuates a brake applying element 16 extending under rod 11 to the brake 12. The link 17 shown in Fig. 3 extending between rockshafts $N^2$ and $O^4$ is a stabilizing link adapted to prevent undue relative bowing or deflection of these rock shafts between their supports at their opposite ends.

The transmission E which is preferably of the shiftable gear type is controlled by a rockable and slidable gear shifter P such as is used with the H-plate type of control. The opposite ends of the shifter P are universally coupled with the links P' which in turn are connected to the levers $P^2$ and $P^3$ arranged above the opposite platforms. Each of these levers is fulcrumed upon a pivotal link $P^4$, the arrangement being such as to permit both of the rocking and the longitudinal sliding of the shifter P by either of the levers $P^2$, $P^3$. One of the links P' is also provided with a rock arm $P^5$ connected to a link $P^6$ pivotally and slidably fulcrumed at $P^7$ to the frame and having its opposite end connected with a universally rockable control lever $P^8$. Thus the shifting of the gears may be effected either from the driver's seat through the lever $P^8$ or from either of the platforms through the levers $P^2$ and $P^3$. Rotatively mounted upon the upper ends of said levers are the handle portion $P^9$ and $P^{10}$ which as shown are connected through suitable linkage or Bowdin wire $P^{11}$ and $P^{12}$ to the carburetor throttle valve of the vehicle (not shown). With this arrangement it will be apparent that the levers $P^2$ and $P^3$ in addition to effecting the gear shifting of the transmission also are instrumental in governing the speed of the motor.

The steering of the vehicle may also be effected either from the position of the driver's seat or from either of the platforms. As shown a foldable operating lever Q is connected to a steering post Q' adjacent to the driver's seat and the latter through a system of links, rock arms and rock shafts $Q^2$, $Q^3$, $Q^4$ to a second steering control lever $Q^5$ arranged centrally of the chassis and in rear of the hood K. This second control lever is fulcrumed to swing in a plane transverse to the chassis and the connections are such that a rocking of the lever in either direction will effect the turning of the vehicle in the direction in which it is rocked. As shown, the connection to the front ground wheels is through a link $Q^6$ operated from the rock shaft $Q^4$ and connected to the cross link $Q^7$ which connects the wheel turning arms $Q^8$.

The body R of the vehicle extends the full length of the side sills A and as previously described, is provided with doors R' in the rear, side doors $R^2$ above the platforms and front doors $R^3$ on opposite sides of the radiator. The upper portion of the body in front of the side doors is chiefly glass thereby affording a clear vision both from the driver's seat and also where the vehicle is operated from the platforms. The portion of the body in rear of the side doors is used solely for storage for the load and is preferably of such dimensions as to be exactly divisible by the corresponding dimensions of the separate boxes or receptacles for receiving the articles to be delivered. Thus in the case of a milk route the boxes containing the milk bottles are arranged in transverse and longitudinal rows and in tiers so as to utilize all of the space in rear of the side doors. There is also space for a single transverse row of boxes in advance of the side doors but in rear of the hood K while on top of this hood and at one side of the driver's seat there is provided space for additional tiers of boxes. All of these are readily accessible either from the side or the rear of the car and when emptied they may temporarily be placed on the top of the car the roof of which is provided with a retaining rail S. When, however a sufficient number of empties have accumulated they may be stacked and placed in the empty space within the body. If it is found more convenient to remove the boxes from the side doors, after the removal of the first row the back rows may be shoved forward from the rear and empties placed in the rear space.

The hoods K and M' and tunnel M are preferably built in as a part of the body, the hood K being hinged to permit the folding back for access to the engine. There are also arranged louver plates T on opposite sides of the body forming the ends of the hood K and providing for the escape of air circulating through the hood by the fan.

In operation, the engine after starting is usually permitted to run continuously so as to be always ready for a quick start. When deliveries are close together it is not necessary for the delivery man to mount to the driver's seat as he can always control the car from either of the low platforms. These platforms are dropped a considerable distance below the level of the floor of the body but sufficiently high to permit the operator to reach the load carrying boxes therefrom. The space between the door openings is usually left vacant to be used as an aisle but if desired this too may be used for carrying additional load in which case the auxiliary steering lever $Q^5$ is removed to make driving of the vehicle effective from the front seat. As soon as this additional load is removed from the aisle and the boxes placed on the top, the steering lever may be inserted in its socket and the vehicle controlled from one of the low platforms.

It frequently happens that a business concern engaged in the delivery of milk during certain hours of the day may wish to use the delivery cars for other loads such for instance as ice during other hours of the day. My construction is particularly adapted to such use as the whole of the space in rear of the driver's seat is unobstructed when the auxiliary steering lever is removed.

While the engine is usually permitted to run continuously, the car is preferably equipped with a starter which through electrical connections may be operated either from the driver's seat or from the platforms. As indicated in the drawings U, U' and U² are starter switches or push buttons which are arranged respectively at the front and at the two sides of the car.

What I claim as my invention is:

1. The combination with a chassis frame, of a body extending the entire length of said frame and provided with front, rear and opposite side door openings, a radiator at the front of said body between the front door openings thereof, a motor in rear and spaced from said radiator projecting upward above said frame and within said body, a hood covering said motor and constituting the driver's seat, motor control and steering means operable from said driver's seat, running boards below the side door openings of the body and auxiliary motor control and steering means operable from said running boards.

2. The combination with a chassis frame, of a body extending the entire length of said frame and provided with door openings at the rear, upon opposite sides and at the front of said body, said front door openings being arranged upon opposite sides of the center of the front, a radiator arranged at the center of said front, a motor in rear of and spaced from said radiator mounted on said body and extending upward above the same within said body, a hood for said motor constituting a driver's seat, motor control and steering devices arranged within said body to be operable from said driver's seat, running boards on opposite sides of the body below said side door openings, auxiliary motor control devices mounted on said running boards and an auxiliary steering control arranged centrally within said body between said door openings and operable from said running boards.

3. The combination of a chassis having side sills extending horizontally from end to end, a body mounted on said side sills and substantially the full length thereof, said body being provided with door openings centrally of each side thereof, a running board depending from each side sill below said door openings, a vertical internal combustion engine mounted on said frame forward of said running boards and extending upward above said side sills, a hood covering said motor and constituting a driver's seat, a motor control and steering control means operable from said driver's seat, auxiliary motor control devices arranged above each running board and operable therefrom and an auxiliary steering control arranged centrally of said body between said side door openings in a position to be operated from either running board.

4. The combination with a chassis frame having opposite side sills extending horizontally from end to end, of a radiator mounted at the forward end of said sills, a vertical internal combustion engine mounted on said frame in rear of and spaced from said radiator, said engine extending above said side sills, a body extending substantially the entire length of said frame provided with door openings centrally of each side thereof, a hood within said body extending transversely thereacross covering said engine and constituting a driver's seat, an air tunnel extending from said radiator to said hood and arranged centrally of said frame, motor control and steering mechanism in operative relation to the driver's seat, running boards secured to said side sills and depending therefrom to be arranged below said side door openings, auxiliary motor control devices above said running boards and an auxiliary steering control lever arranged centrally between said door openings, said lever being operable from either of said running boards and being laterally rockable to turn the car in the direction in which it is rocked.

5. A chassis for a motor delivery car comprising a frame having horizontal side sills extending from end to end, a radiator mounted at the forward end of said frame, a vertical multi-cylinder explosion engine in rear of and spaced from said radiator mounted on said frame and extending upward between the side sills thereof, a shiftable gear transmission and propeller shaft in alignment with said engine and extending longitudinally of said frame, a rear drive axle, a worm gear drive connection between said propeller shaft and axle, a running board at the side and depending from said frame and motor control means including a gear shift alternatively operable from in front of said engine and from said running board.

6. A chassis for a motor delivery car comprising a frame having side sills extending horizontally from end to end, a radiator mounted at the forward end of said frame, a vertical multi-cylinder internal combustion engine mounted on said frame in rear of and spaced from said radiator and extending upward above said side sills, a hood enclosing the upward extension of said engine and extending across said frame, a hood in rear of said radiator, a tunnel arranged centrally of said frame connecting said radiator hood and said engine hood, a driver's seat on one side of said engine hood, motor control devices in front of and operable from said driver's seat, a running board at the side of said frame, and auxiliary motor control devices operable from said running board.

7. A chassis for a motor delivery car comprising a frame having side sills extending horizontally from end to end, a radiator mounted at the forward end of said frame, a vertical multi-cylinder internal combustion engine mounted on said frame in rear of and spaced from said radiator and extending upward above said side sills, a hood enclosing the upward extension of said engine and extending across said frame, a hood in rear of said radiator, a tunnel arranged centrally of said frame connecting said radiator hood and said engine hood, a forward extension of the motor drive shaft, a fan on the shaft and within the radiator hood, a driver's seat on said engine hood, motor control devices in front of and operable from said driver's seat, a running board on the sides of said frame and auxiliary motor control devices and operable from said running board.

8. A motor delivery car comprising a chassis having side sills extending horizontally from end to end, a radiator mounted at the forward end of said sills, a vertical multi-cylinder explosion engine mounted on said frame in rear of and spaced from said radiator and extending upward above said side sills, a hood for enclosing the upward extension of said motor extending across said chassis, a hood in rear of said radiator, a tunnel connecting said radiator hood with said engine hood, a rear driving axle and drive connections between said motor and axle including a shiftable gear transmission, a running board at the side and depending from the chassis frame, motor control devices including a gear shift operable from in front of said motor and from said running board, and a body mounted on said chassis extending substantially from end to end thereof having a side door opening above said running board and in rear of said engine hood.

9. In a motor vehicle of the class described having a chassis, a motor and transmission therefor mounted upon said chassis, platforms disposed upon opposite sides of said chassis, control levers positioned upon said chassis and projecting above said platforms for operating the transmission, and means mounted upon said levers for controlling the speed of said motor.

10. In a house-to-house motor delivery vehicle, the combination of a chassis having front and rear wheels, a body on said chassis, a platform for the operator supported by said chassis at a low level providing standing height clearance for the operator between the platform and the top of said body, steering operating mechanism accessible to one hand of the operator while standing on said platform, an internal combustion engine near the forward end of said chassis, driving connections between said engine and one of said wheels including a clutch and a selective gear transmission, a manually operable gear selector control lever operable by the other hand of the operator from said platform, means mounted on said control lever for manually controlling the speed of the engine; and pedal means operable from said platform for applying brakes to said vehicle while the operator is standing on one foot on said platform.

11. In a house-to-house motor delivery vehicle, the combination of a chassis, a low level operating platform on said chassis, a throttle-controlled driving motor on said chassis, a variable speed transmission, a manually operable control lever for said transmission, and manually operable means on said lever for controlling the throttle of said motor, said lever being positioned for actuation by the operator while standing on said platform.

12. In a house-to-house motor delivery vehicle, the combination of a chassis, a low level operating platform on said chassis, a throttle-controlled driving motor on said chassis, a variable speed transmission, a control lever for said transmission mounted for shifting movements in a plurality of different planes, and manually operable means on said lever for controlling the throttle of said motor independently of said shifting movements, said lever being positioned for actuation by one hand of the operator while standing on said platform.

13. In a house-to-house motor delivery vehicle, the combination of a chassis, a low level operating platform on said chassis, a throttle-controlled driving motor on said chassis, a variable speed transmission, a manually operable control lever for said transmission, a control lever for said transmission mounted for shifting movements in a plurality of different planes, a rotatable handle on said control lever, and means connecting said rotatable handle with said throttle for operating the latter independently of the shifting movements of said control lever, said lever being positioned for actuation by one hand of the operator while standing on said platform.

14. In a vehicle of the house-to-house delivery type having a driving engine and transmission cooperating therewith, the combination of a chassis having front and rear wheels, a body carried by said chassis, a driving platform for the operator supported by said chassis between said front and rear wheels at a relatively low level whereby to provide convenient approach of the operator to said platform, a pedal operable to brake the vehicle by actuation of one foot of the operator while standing mostly on the other foot on said platform, means operable to steer said front wheels by actuation of one hand of the operator while standing on said platform, and means operable to actuate said transmission and control the speed of said engine by actuation of the other hand of the operator while standing on said platform.

15. In a vehicle of the house-to-house delivery type having a driving engine and transmission co-operating therewith, the combination of a chassis having front and rear wheels, a body carried by said chassis, a driving platform for the operator supported by said chassis between said front and rear wheels at a relatively low level whereby to provide convenient approach of the operator to said platform, a pedal operable to brake the vehicle by actuation of one foot of the operator while standing mostly on the other foot on said platform, means operable to steer said front wheels by actuation of one hand of the operator while standing on said platform, and means operable to actuate said transmission and control the speed of said engine by actuation of the other hand of the operator while standing on said platform, said last named means including a shiftable lever provided with a relatively movable handle grip at the outer end thereof.

16. In a vehicle of the house-to-house delivery type having a driving engine and transmission co-operating therewith, the combination of a chassis having front and rear wheels, a body carried by said chassis, a driving platform for the operator supported by said chassis between said front and rear wheels at a relatively low level whereby to provide convenient approach of the operator to said platform, a pedal operable to brake the vehicle by actuation of one foot of the operator while standing mostly on the other foot on said platform, means operable to steer said front wheels by actuation of one hand of the operator while standing on said platform, and means operable to actuate said transmission and control the speed of said engine by actuation of the other hand of the operator while standing on said platform, said pedal, steering means, and transmission actuating means being cooperatively located for operation while the operator is in substantially one position of location on said platform.

17. In a vehicle of the house-to-house delivery type having a driving engine and transmission cooperating therewith, the combination of a chassis having front and rear wheels, a body carried by said chassis, a driving platform for the operator supported by said chassis between said front and rear wheels at a relatively low level whereby to provide convenient approach of the operator to said platform, a pedal operable to brake the vehicle by actuation of one foot of the operator while standing mostly on the other foot on said platform, means operable to steer said front wheels by actuation of one hand of the operator while standing on said platform, and means operable to actuate said transmission and control the speed of said engine by actuation of the other hand of the operator while standing on said platform, said steering means and transmission actuating means being cooperatively located for simultaneous operation.

18. In an engine propelled vehicle of the house-to-house delivery type, a relatively low level driving platform providing convenient approach of the operator to the vehicle, a plurality of vehicle controls associated with said platform whereby said operator can actuate said controls while standing on said platform and while driving the vehicle, one of said controls having a multiple vehicle controlling function and comprising a manually operable device, one function of which is to regulate the speed of the vehicle engine, another of said controls comprising a vehicle braking pedal located adjacent said platform and adapted for operation by one foot while said operator stands mostly on his other foot on said platform.

19. In an engine propelled vehicle of the house-to-house delivery type, a relatively low level driving platform providing convenient approach of the operator to the vehicle, a plurality of vehicle controls associated with said platform whereby said operator can actuate said controls while standing on said platform and while driving the vehicle, one of said controls having a multiple vehicle controlling function and comprising a manually operable device, one function of which is to control the torque transmitted from said engine for driving the vehicle, another of said controls comprising a pedal adapted for foot operation while the operator stands mostly on his other foot on said platform.

20. In an engine propelled vehicle of the house-to-house delivery type, a relatively low level driving platform providing convenient approach of the operator to the vehicle, a vehicle control pedal positioned for operation by one foot of the operator while standing mostly on the other foot on said platform, manual steering controlling means positioned for operation by said operator when standing on said platform, and manual transmission controlling means positioned for operation by said operator when standing on said platform, and means carried by one of said controlling means and operable simultaneously therewith for manually regulating the speed of the vehicle engine.

21. In a vehicle of the house-to-house delivery type having a body carried by front and rear ground wheels, a driving platform for the vehicle operator between said front and rear wheels at a relatively low level whereby to provide convenient approach of the operator thereto and to accommodate the operator when standing on said platform, an internal combustion engine spaced longitudinally of the vehicle from said platform and adapted to drive certain of said wheels, a clutch device, a brake device, a transmission device, an engine speed regulating device, controlling mechanism operable to steer said front wheels by actuation of one hand of the operator while standing mostly on one foot on said platform, and a pair of further controlling mechanisms located for convenient manipulation by the operator by his other hand and foot respectively when standing as aforesaid, one of said controlling mechanisms being adapted to control a plurality of said devices.

22. In a vehicle of the house-to-house delivery type having a body carried by front and rear ground wheels, a driving platform for the vehicle operator between said front and rear wheels at a relatively low level whereby to provide convenient approach of the operator thereto and to accommodate the operator when standing on said platform, an internal combustion engine spaced longitudinally of the vehicle from said platform and adapted to drive certain of said wheels, a clutch device, a brake device, a transmission device, an engine speed regulating device, controlling mechanism operable to steer said front wheels by actuation of one hand of the operator while standing mostly on one foot on said platform, and a pair of further controlling mechanisms located for convenient manipulation by the operator by his other hand and foot respectively when standing as aforesaid, one of said pair of controlling mechanisms being adapted to control a plurality of said devices.

23. In a vehicle of the house-to-house delivery type having a body carried by front and rear ground wheels, a driving platform for the vehicle operator between said front and rear wheels at a relatively low level whereby to provide convenient approach of the operator thereto and to accommodate the operator when standing on said platform, an internal combustion engine spaced longitudinally of the vehicle from said platform and adapted to drive certain of said wheels, a clutch device, an engine speed regulating device, a transmission device, controlling mechanism operable to steer said front wheels by actuation of one hand of the operator while standing mostly on one foot on said platform, and a pair of further controlling mechanisms located for convenient manipulation by the operator by his other hand and foot respectively when standing as aforesaid, one of said controlling mechanisms having a multiple function whereby to control a plurality of said devices, one function thereof being to cause actuation of said engine speed regulating device.

24. In a vehicle of the house-to-house delivery type having a body carried by front and rear ground wheels, a driving platform for the vehicle operator between said front and rear wheels at a relatively low level whereby to provide convenient approach of the operator thereto and to accommodate the operator when standing on said platform, an internal combustion engine spaced longitudinally of the vehicle from said platform and adapted to drive certain of said wheels, a brake device, an engine throttle changing device, a transmission device, controlling mechanism operable to steer said front wheels by actuation of one hand of the operator while standing mostly on one foot on said platform, and a pair of further controlling mechanisms located for convenient manipulation by the operator by his other hand and foot respectively when standing as aforesaid, said controlling mechanism adapted for manipulation by said other hand of the operator actuating a plurality of said devices.

25. In a vehicle of the house-to-house delivery type having a body carried by front and rear ground wheels, a driving platform for the vehicle operator between said front and rear wheels at a relatively low level whereby to provide convenient approach of the operator thereto and to accommodate the operator when standing on said platform, an internal combustion engine spaced longitudinally of the vehicle from said platform and adapted to drive certain of said wheels, a transmission device, an engine throttle changing device, a clutch device, a brake device, controlling mechanism operable to steer said front wheels by actuation of one hand of the operator while standing on said platform, a further controlling mechanism located for convenient manipulation by the other hand of the operator when standing as aforesaid, one of said controlling mechanisms having a multiple function whereby to control a plurality of said devices, one function thereof being to control said throttle changing device.

26. A delivery vehicle comprising a chassis having front and rear wheels, a low level operating platform between said front and rear wheels, an internal combustion engine forwardly of said platform adapted to drive certain of said wheels, a selective gear transmission, a clutch, a drive shaft operatively connecting said engine with a rear wheel, braking means for said vehicle, a pedal associated with said platform operatively connected to both said clutch and said braking means and adapted to be actuated while the operator is standing on one foot in said platform, and a gear shift lever for operating said transmission, said shift lever being positioned for convenient operation when said operator is standing as aforesaid.

27. A delivery vehicle comprising a chassis having front and rear wheels, a low level operating platform between said front and rear wheels, an internal combustion engine forwardly of said platform adapted to drive certain of said wheels, a selective gear transmission forward of said platform, a clutch, a gear shift lever, a steering device operable from said platform, braking means for said vehicle, and a pedal associated with said platform operatively connected to both said clutch and braking means and adapted to be foot-actuated while the operator is standing on said platform adjacent said steering device and said gear shift lever, said vehicle having loading platforms respectively forwardly and rearwardly of said operating platform longitudinally of the vehicle and at a higher level than said operating platform.

28. A delivery vehicle comprising a frame having front and rear wheeled axles, an operating platform supported by said frame forming a low level driving support for the vehicle operator, a motor forwardly of said platform, a propeller shaft connecting said motor and said rear axle, a clutch, a selective speed transmission, a gear shift lever for said transmission, a pedal associated with said platform, braking means for the vehicle, and means connecting said pedal to said clutch and said braking means for operating the same from a standing position on said platform, said vehicle having loading platforms respectively forwardly and rearwardly of said operating platform longitudinally of the vehicle and at a higher level than said operating platform.

29. A delivery vehicle comprising a frame having front and rear wheeled axles, an operating platform supported by said frame forming a low level driving support for the vehicle operator, a motor forwardly of said platform, a propeller shaft connecting said motor and said rear axle, a clutch, a selective speed transmission, an emergency brake actuator associated with said platform so as to be manually operable therefrom, a pedal associated with said platform, braking means for the vehicle, and means connecting said pedal to said clutch and to said braking means for operating the same from a standing position on said platform, said vehicle having loading platforms respectively forwardly and rearwardly of said operating platform longitudinally of the vehicle and at a higher level than said operating platform.

30. In a vehicle of the house-to-house delivery type having front and rear wheels, a low level operating platform between said front and rear wheels, an internal combustion engine forwardly of said platform adapted to drive certain of said wheels, a transmission, a clutch, a transmission controlling lever, a steering device operable from said platform, braking means for said vehicle, and means associated with said platform operable by a continuous movement of one foot of the vehicle operator while standing mostly on the other foot on said platform for actuating said clutch and said braking means, said steering device and said transmission controlling lever being positioned for actuation by said vehicle operator when he is in the position aforesaid.

31. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine spaced longitudinally of the vehicle from said platform and adapted to drive certain of said wheels, means operable to steer said front wheels by actuation of one hand of the operator while standing mostly on one foot on said platform, a clutch device, a brake device, an engine speed regulating device, a transmission associated with said engine, means operable to control said transmission by actuation of the other hand of the operator when he is in said standing position, and a multiple functioning mechanism for controlling a plurality of the aforesaid devices, said mechanism being actuable by the other foot of the operator when he is in said standing position.

32. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine spaced longitudinally of the vehicle from said platform and adapted to drive certain of said wheels, means operable to steer said front wheels by actuation of one hand of the operator while standing mostly on one foot on said platform, a clutch device, a brake device, an engine speed regulating device, a transmission associated with said engine, means operable to control said transmission by actuation of the other hand of the operator when he is in said standing position, and a multiple functioning mechanism for controlling a plurality of the aforesaid devices, said mechanism being actuable by the other foot of the operator when he is in said standing position, one function thereof being to cause actuation of said clutch device.

33. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine spaced longitudinally of the vehicle from said platform and adapted to drive certain of said wheels, a clutch device, a vehicle braking device, an engine speed regulating device, means operable to steer said front wheels by actuation of one hand of the operator while standing mostly on one foot on said platform, a transmission associated with said engine, means operable to control said transmission by actuation of the other hand of the operator when he is in said standing position, and a multiple functioning mechanism for controlling a plurality of the aforesaid devices, said mechanism being actuable by the other foot of the operator when he is in said standing position, one function thereof being to cause actuation of said clutch device, said multiple functioning mechanism being responsive to a single continuous movement of the operator's foot.

34. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine spaced longitudinally of the vehicle from said platform and adapted to drive certain of said wheels, a clutch device, a brake device, an engine throttle changing device, means operable to steer said front wheels by actuation of one hand of the operator while standing mostly on one foot on said platform, a transmission associated with said engine, means operable to control said transmission by actuation of the other hand of the operator when he is in said standing position, a multiple functioning mechanism for controlling a plurality of said devices, said mechanism being actuable by the other foot of the operator when he is in said standing position, and a seat for the operator mounted in said vehicle, said steering means being operable by the operator when sitting on said seat.

35. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine spaced longitudinally of the vehicle from said platform and adapted to drive certain of said wheels, a clutch device, a brake device, an engine throttle changing device, means operable to steer said front wheels by actuation of one hand of the operator while standing mostly on one foot on said platform, a transmission associated with said engine, means operable to control said transmission by actuation of the other hand of the operator when he is in said standing position, a multiple functioning mechanism for controlling a plurality of said devices, said mechanism being actuable by the other foot of the operator when he is in said standing position, and a seat for the operator mounted in said vehicle, said steering means and said transmission control means being operable by the operator when sitting on said seat.

36. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine spaced longitudinally of the vehicle from said platform and adapted to drive certain of said wheels, a clutch device, a brake device, an engine throttle changing device, means operable to steer said front wheels by actuation of one hand of the operator while standing mostly on one foot on said platform, a transmission associated with said engine, means operable to control said transmission by actuation of the other hand of the operator when he is in said standing position, a multiple functioning mechanism for controlling a plurality of said devices, said mechanism being actuable by the other foot of the operator when he is in said standing position, and a seat for the operator mounted in said vehicle, said steering means and said transmission control means and also said multiple functioning mechanism being operable by the operator when sitting on said seat.

37. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, a transmission device, an engine speed regulating device, means operable to steer said front wheels by actuation of the operator when standing on said platform or when sitting on said seat, and a multiple functioning mechanism for controlling a plurality of the aforesaid devices, said mechanism being actuable by the operator when he is standing on said platform and actuating said steering means.

38. In a vehicle of the house-to-house delivery type having a body carried by front and rear operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, an engine speed regulating device, means operable to steer said front wheels by actuation of the operator when standing on said platform or when sitting on said seat, and a multiple functioning mechanism for controlling a plurality of the aforesaid devices, said mechanism being actuable by the operator when he is standing on said platform and actuating said steering means, one function thereof being to cause actuation of said clutch device.

39. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, an engine throttle varying device, means operable to steer said front wheels by actuation of the operator when standing on said platform or when sitting on said seat, and a multiple functioning mechanism for controlling a plurality of the aforesaid devices, said mechanism being actuable by the operator when he is standing on said platform and actuating said steering means, one function thereof being to cause actuation of said clutch device, said multiple functioning mechanism being responsive in its said actuation to a single continuous movement of a foot of the operator.

40. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, a transmission device, an engine speed changing device, means operable to steer said front wheels by actuation of the operator when standing on said platform or when sitting on said seat, and a multiple functioning mechanism for controlling a plurality of said devices, said mechanism being actuable by the operator when he is standing on said platform and actuating said steering means, said multiple functioning mechanism being also actuable by the operator when he is sitting on said seat and actuating said steering means.

41. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, an engine speed regulating device, means operable to steer said front wheels by actuation of the operator when standing on said platform or when sitting on said seat, multiple function pedal means and mechanism operated thereby positioned for operation by one foot of the operator while standing on said platform mostly on his other foot and operating said steering means, said pedal means being adapted to control a plurality of said devices.

42. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, an engine throttle varying device, means operable to steer said front wheels by actuation of the operator when standing on said platform or when sitting on said seat, multiple function pedal means and mechanism operated thereby positioned for operation by one foot of the operator while standing on said platform mostly on his other foot and operating said steering means, said pedal means being adapted to control a plurality of said devices, one function thereof being to cause actuation of said clutch device.

43. A delivery vehicle comprising a frame having front and rear wheeled axles, a platform supported by said frame forming a low level driving support for the vehicle operator, a motor forwardly of said platform, a propeller shaft connecting said motor and said rear axle, a clutch, a selective speed transmission, a gear shift lever for said transmission, braking means for the vehicle, and foot actuable means associated with said platform and operable by a single movement of one foot of the operator while standing on the other foot on said platform for causing actuation of said clutch and braking means.

GEORGE M. BACON.

---

CERTIFICATE OF CORRECTION.

Patent No. 1,925,893.            September 5, 1933.

GEORGE M. BACON.

It is hereby certified that error appears in the printed specification of the above numbered patent requiring correction as follows: Page 2, line 130, for "about" read "above"; page 3, line 83, for "portion" read "portions"; page 8, line 127, claim 37, strike out the words "ground wheels, a driving platform for the vehicle" and insert the same after the word "rear" in line 129, claim 38; and that the said Letters Patent should be read with these corrections therein that the same may conform to the record of the case in the Patent Office.

Signed and sealed this 24th day of October, A. D. 1933.

(Seal)            F. M. Hopkins
                                           Acting Commissioner of Patents.

relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, an engine throttle varying device, means operable to steer said front wheels by actuation of the operator when standing on said platform or when sitting on said seat, and a multiple functioning mechanism for controlling a plurality of the aforesaid devices, said mechanism being actuable by the operator when he is standing on said platform and actuating said steering means, one function thereof being to cause actuation of said clutch device, said multiple functioning mechanism being responsive in its said actuation to a single continuous movement of a foot of the operator.

40. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, a transmission device, an engine speed changing device, means operable to steer said front wheels by actuation of the operator when standing on said platform or when sitting on said seat, and a multiple functioning mechanism for controlling a plurality of said devices, said mechanism being actuable by the operator when he is standing on said platform and actuating said steering means, said multiple functioning mechanism being also actuable by the operator when he is sitting on said seat and actuating said steering means.

41. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, an engine speed regulating device, means operable to steer said front wheels by actuation of the operator when standing on said platform or when sitting on said seat, multiple function pedal means and mechanism operated thereby positioned for operation by one foot of the operator while standing on said platform mostly on his other foot and operating said steering means, said pedal means being adapted to control a plurality of said devices.

42. In a vehicle of the house-to-house delivery type having a body carried by front and rear ground wheels, a driving platform for the vehicle operator between said front and rear wheels at a relatively low level whereby to provide convenient approach of the operator thereto, an internal combustion engine forwardly of said platform adapted to drive certain of said wheels, a seat mounted in said vehicle, a clutch device in the drive between said engine and said driven wheels, a vehicle braking device, an engine throttle varying device, means operable to steer said front wheels by actuation of the operator when standing on said platform or when sitting on said seat, multiple function pedal means and mechanism operated thereby positioned for operation by one foot of the operator while standing on said platform mostly on his other foot and operating said steering means, said pedal means being adapted to control a plurality of said devices, one function thereof being to cause actuation of said clutch device.

43. A delivery vehicle comprising a frame having front and rear wheeled axles, a platform supported by said frame forming a low level driving support for the vehicle operator, a motor forwardly of said platform, a propeller shaft connecting said motor and said rear axle, a clutch, a selective speed transmission, a gear shift lever for said transmission, braking means for the vehicle, and foot actuable means associated with said platform and operable by a single movement of one foot of the operator while standing on the other foot on said platform for causing actuation of said clutch and braking means.

GEORGE M. BACON.

---

CERTIFICATE OF CORRECTION.

Patent No. 1,925,893.     September 5, 1933.

GEORGE M. BACON.

It is hereby certified that error appears in the printed specification of the above numbered patent requiring correction as follows: Page 2, line 130, for "about" read "above"; page 3, line 83, for "portion" read "portions"; page 8, line 127, claim 37, strike out the words "ground wheels, a driving platform for the vehicle" and insert the same after the word "rear" in line 129, claim 38; and that the said Letters Patent should be read with these corrections therein that the same may conform to the record of the case in the Patent Office.

Signed and sealed this 24th day of October, A. D. 1933.

(Seal)           F. M. Hopkins
                 Acting Commissioner of Patents.

CERTIFICATE OF CORRECTION.

Patent No. 1,925,893.  September 5, 1933.

GEORGE M. BACON.

It is hereby certified that error appears in the printed specification of the above numbered patent requiring correction as follows: Page 2, line 130, for "about" read "above"; page 3, line 83, for "portion" read "portions"; page 8, line 127, claim 37, strike out the words "ground wheels, a driving platform for the vehicle" and insert the same after the word "rear" in line 129, claim 38; and that the said Letters Patent should be read with these corrections therein that the same may conform to the record of the case in the Patent Office.

Signed and sealed this 24th day of October, A. D. 1933.

(Seal)

F. M. Hopkins
Acting Commissioner of Patents.